United States Patent [19]
Shaffer

[11] 3,906,619
[45] Sept. 23, 1975

[54] METHOD FOR SECURING CABLE PULLER CONNECTOR TO A CABLE

[76] Inventor: Frank E. Shaffer, P.O. Box 1546, Costa Mesa, Calif. 92626

[22] Filed: Oct. 4, 1973

[21] Appl. No.: 403,671

[52] U.S. Cl. ............... 29/517; 24/115 A; 29/458; 174/79
[51] Int. Cl.² ................... B21D 39/00; B23P 11/00
[58] Field of Search ......... 29/517, 518, 630 A, 458; 24/122.3, 115 A; 174/79; 339/100

[56] References Cited
UNITED STATES PATENTS

| | | | |
|---|---|---|---|
| 1,227,726 | 5/1917 | Woodhead | 29/630 A |
| 2,327,650 | 8/1943 | Klein | 24/115 A UX |
| 2,551,299 | 5/1951 | Sowa | 29/630 A X |
| 2,622,314 | 12/1952 | Bergan | 29/517 |
| 3,055,412 | 9/1952 | Debner | 29/517 X |
| 3,750,453 | 8/1973 | Dryden | 29/517 X |

Primary Examiner—Charlie T. Moon
Attorney, Agent, or Firm—Fulwider, Patton, Rieber, Lee & Utecht

[57] ABSTRACT

A method for securing a cable puller connector of the type including a thin walled tubular body formed with an open end to receive one end of a multiple electrical wire coated cable, such puller connector also including a fastener on its closed end for connection with a pulling device. The method includes the steps of inserting the multiple wire cable into the open end of the puller body and then swaging the walls of such body inwardly from opposite sides to form respective narrow holding rings having a cross sectional contour different than the normal contour of the cable to thereby force the cable coating inwardly about the exterior leads in such cable and urging such leads together with sufficient force to cause the composite frictional holding force of the multiple swaged rings formed by such body to hold such body against slipping from the cable upon pulling said fastener.

5 Claims, 5 Drawing Figures

US Patent  Sept. 23, 1975  3,906,619
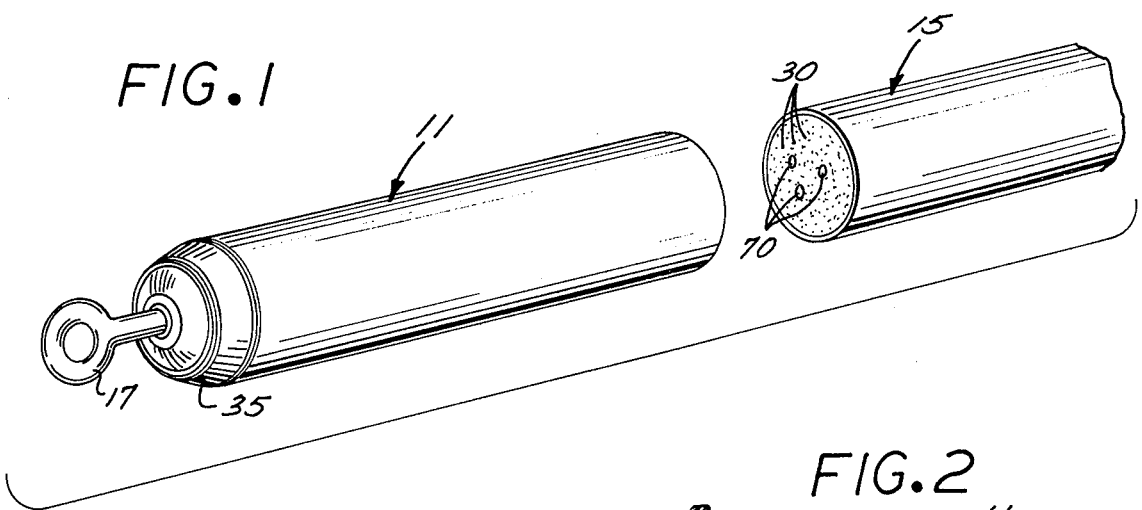
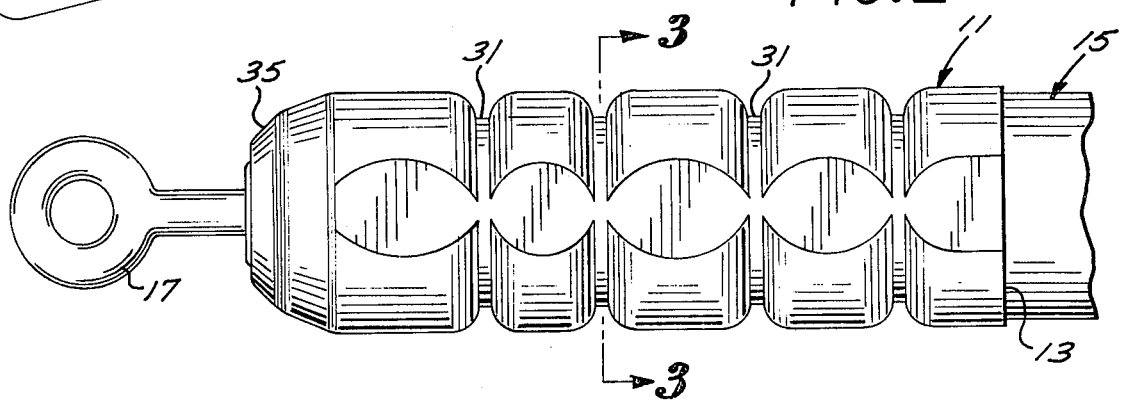
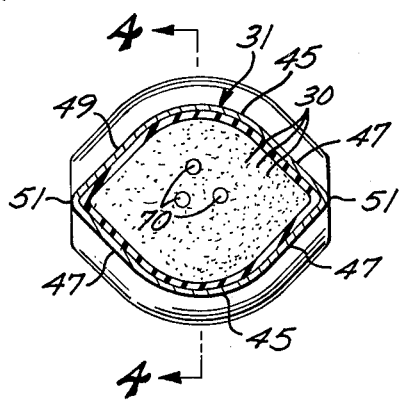
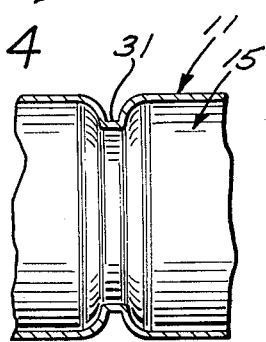
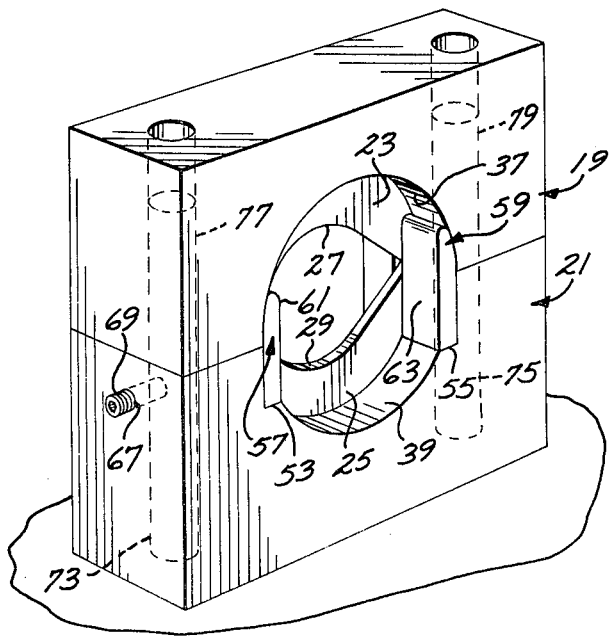

METHOD FOR SECURING CABLE PULLER CONNECTOR TO A CABLE

BACKGROUND OF THE INVENTION

1. Field of the Invention

The present invention relates to cable puller devices and more particularly to cable pullers including thin walled tubular bodies.

2. Description of the Prior Art

In the running of telephone lines through heavily populated areas, it is common practice to incorporate a plurality of such lines in a single multiple lead cable with each lead being individually insulated and the entire composite cable being coated on the exterior with electrically insulating and moisture proof coating. Each individual multiple wire cable may have as many as 10 to 2,200 separate leads therein. In running multi-strand cables of this type, it is common practice to provide underground ducts which may have a number of different multi-lead cables installed therein. Normally the ducts are buried underground with duct terminals being provided at periodic locations for access to the ducts for pulling of cables therethrough and for making connections between joining leads in such cables. Conventionally, pulling lines are extended through the ducts and the individual multi-lead cables connected therewith and such lines pulled to pull the multi-lead cable through the ducts. Since moisture often enters such underground ducts, it is desirable to seal the lead end of cables being drawn therethrough from the entry of moisture. Consequently, it is desirable to provide a cable puller connector which can rapidly be secured to the lead extremity of a multi-lead cable and which will also seal such lead end against the entry of unwanted moisture.

Conventionally, cable puller connectors have been provided which include tubes which are open on one end for fitting over the free extremity of the cables and have their opposite ends formed to converge inwardly to bore for passage of a threaded rod which is formed on its interior end with an enlarged head forming a shoulder. The cable to be secured to the puller connector then has the coating peeled back for a distance from the lead extremity thereof and an annular area of the exterior leads in such cable are peeled back to expose a plurality of central leads defining a central core of leads. Such central core of leads are then cut off and the enlarged head of such rod abutted against the ends thereof and the exterior annulus of leads then brought back to form a skirt projecting axially around the enlarged head of such rod and along the shank thereof. An annular wedge is then fitted down over the skirt of leads projecting along such rod to wedge such leads against the shoulder of such head and the free extremities of such leads then peeled back to overlie the end of such annular wedge. The pulling line may then be secured to the extremity of the rod projecting from the tubular puller and pulling thereon will wedge the cable leads firmly between the annular wedge and enlarged head of such rod to maintain the pulling line secured to such cable as the cable is pulled through a subterranean duct. Frequently, the walls of the tube are crimped inwardly under relatively low crimping forces to form a moisture seal. Obviously, an arrangement of this type suffers the short-coming that substantial time is consumed in making the connection to the multiple lead cable and the resultant moisture seal is not highly effective.

SUMMARY OF THE INVENTION

The method of the present invention is characterized by the attachment of a tubular cable puller connector to the free extremity of a multiple lead cable by swaging the opposite walls thereof inwardly at a series of locations along the length thereof to form a plurality of gripping rings. A pair of dies may be utilized which include opposed swaging blades formed with confronting symetrically shaped edges which form a contour different from the normal transverse contour of the cable and, when the dies are in their closed positions, has a transverse dimension that is smaller than the smallest normal transverse dimension of the undisturbed multiple lead cable. Preferably, retaining plates are disposed at the opposite extremities of such blades and project therebetween to retain the opposite sides of the connector body against excessive flattening upon swaging thereof and consequent formation of sharp corners or edges.

Other objects and advantages of the present invention will become apparent from a consideration of the following detailed description when taken in conjunction with the accompanying drawing.

BRIEF DESCRIPTION OF THE DRAWING

FIG. 1 is a perspective view of a cable puller connector to be swaged on a cable in accordance with the method of the present invention;

FIG. 2 is a side view of the cable puller connector shown in FIG. 1 after it has been swaged on a cable;

FIG. 3 is a transverse sectional view taken along the line 3—3 of FIG. 2;

FIG. 4 is a longitudinal sectional view taken along the line 4—4 of FIG. 3; and

FIG. 5 is a perspective view of a swaging apparatus which may be used to swage the cable puller connector shown in FIG. 1

DESCRIPTION OF THE PREFERRED EMBODIMENT

Referring to FIGS. 2, 3 and 5, therefor cable puller connector of the present invention includes a thin walled, malleable, tubular body 11 having an open end 13 for receipt of a multiple lead cable 15 and is being closed on its opposite end to carry an eye fitting 17 for connection with a pulling line. In securing the connector 11 to the cable 15, a pair of dies 19 and 21 are provided which include opposed swaging blades 23 and 25 formed with arch shaped confronting edges 27 and 29 which cooperate when the dies 19 and 21 are closed to form an eliptical shaped opening having a short dimension which is approximately 75% the length of the normal cross sectional diameter of the cable 15. Consequently, the puller body 11 may be telescoped over the cable 15 and such body then placed between the swaging blades 23 and 25 and the dies 19 and 21 closed to swage the opposite sides of the wall of such body 11 inwardly to form a relatively short gripping ring 31 which serves to distort the cable 15 from its normal circular configuration to the egg shaped configuration shown in FIG. 3. A number of such gripping rings 31 may be formed along the connector body 11 with each enhancing the gripping integrity of the connector and also sealing the connector against entry of moisture from the open end thereof.

The multiple lead cables 15 are frequently ⅝ inch to 3 inches in diameter and have from 10 to 2,200 individual wires 30 therein. The connector body 11 may be made from thin walled maleable tubing which is slightly larger in diameter than the cable 15 to which it is to be connected and may have a wall 1/16 of an inch thick. One end of the connector is preferably formed to converge inwardly to form a dome 35 to which the eye fitting 17 is connected. Such eye fitting 17 may be secured to such dome 35 in any convenient manner, such as by welding to form a moisture proof closure.

The dies 19 and 21 are conveniently constructed from steel bodies having confronting semicircular cutouts 37 and 39 formed therein with the swaging blades 23 and 25 being mounted centrally in such cutouts. The blades 23 and 25 are preferably of hardened steel construction and may be removable for periodic replacement as wear thereof takes place. It has been determined that the arch-like configuration shown for the blade edges 27 and 29 forms a particularly effective gripping ring 31 which includes opposed circular segments 45 that project outwardly at their opposite ends to form legs 47 and 49 which connect together at their adjacent extremities by means of a smooth turn back 51.

Referring to FIG. 5, the lower die 21 is formed with a pair of upwardly opening slots 53 and 55 disposed on opposite sides of the swaging blade 25, one slot of each pair being disposed at opposite ends of the blades 23 and 25. Disposed removably in such slots 53 and 55 are respective retaining plates, generally designated 57 and 59, which are each formed with inwardly facing retaining surfaces 61 and 63 which project across the sharp points formed by the opposite ends of the elliptical shaped opening formed by the swaging blade edges 27 and 29. Thus, such retaining surfaces 61 and 63 will support the opposite sides of the wall of the connector which may be utilized in the method body 11 from swaging outwardly into the points of such sharp corners to thereby avoid formation of sharp edges which may catch on surrounding items, such as adjacent coated cables, causing damage thereto.

Respective threaded bores 67 project inwardly from the opposite sides of the die 21 and receive set screws 69 which press on their inner extremities against the respective retaining plates 57 and 59 to hold such retaining plates releasably in position. Consequently, such retaining plates 57 and 59 may be replaced periodically as wear thereof progresses.

Alignment of the dies 19 and 21 is maintained by means of a pair of upstanding alignment dowels 73 and 75 mounted in the lower die 21 and projecting upwardly therefrom to telescope freely into confronting alignment bores 77 and 79 formed in the upper die 19.

In operation, the dies 19 and 21 are mounted in a 20 ton portable hydraulic press with the opposite jaws of such press aligned centrally above and below the die bodies to thereby apply the forces thereof axially to such bodies directly above and below the respective swaging blades 23 and 25. The portable press may then be carried in a workman's truck and when it is desirable to draw a cable 15 through a duct, the pulling line may be extended through such duct to a terminal vault. The workman may then grasp a cable puller connector and telescope the body 11 over the free end of a cable 15 as shown in FIG. 1. If desirable, a plurality of wooden dowels 70 may be driven into the cable 15 prior to fitting the connector thereon to assure that the interior of the body 11 is substantially fully filled.

The dies 19 and 21 are then opened and the cable body 11 projected through the opening formed between the confronting edges of the swaging edges 27 and 29 with such connector body being axially positioned for the desired location of a gripping ring 31. The press is then actuated to force the dies 19 and 21 together with approximately 20 tons of force, the force required obviously varying with the size of the cable 15 to which the connector is being affixed. However, mere crimping of the connector has proven ineffective and it has been determined that the walls thereof must be swaged inwardly with approximately two tons of force for ⅝ inch diameter cable and with 15 tons of force for 3 inch diameter cable, the required force for intermediate size cable varying proportionately with the diameter thereof. As the dies 19 and 21 close over the body 11, the circular portions of the swaging blade edges 27 and 29 will force the opposite sides of such body radially inwardly to cause the walls of such body to swage outwardly at the opposite sides thereof to form the relatively straight leg portions 47 and 49 and concurrently forcing the individual leads 30 in the interior of the cable 15 together under great pressure thereby distorting the insulation on such leads and causing adjacent leads to shift with respect to one another to enable the cable 15 to assume the elliptical shape shown in FIG. 3. As the opposite ends of the gripping ring 31 swage outwardly to form the turn backs 51, such turn backs will engage the retaining plates 57 and 59 disposed on opposite sides of the ends of the blades 23 and 25 to restrain further outward swaging of such ring 31 to thereby avoid formation of excessively sharp points at the turn backs 31 and also avoiding excessive pouching or bulging of the wall of the body about the extremities of the blades 23 and 25 resulting in restricting axial shifting of such body between the blades 23 and 25 when such dies 19 and 21 are subsequently opened.

The dies 19 and 21 are then opened and the connector body 11 shifted axially between the blades 23 and 25 to the location desired for another gripping ring 31 and the dies then again closed to form an additional gripping ring. This process if repeated four or five times will assure adequate securement of the puller connector to the cable 15.

The drawing line may then be connected with the eye fitting 17 and such line pulled through the duct to draw the cable 15 therethrough. As such cable is pulled through the duct, it will be apparent that the exterior surfaces of the puller body 11 are relatively smooth, thus avoid hanging up on adjacent cables already placed in such duct or cutting of the coating of such cable by sharp edges. Further, if the puller 11 encounters moisture in the duct, such moisture is sealed against entering the open end of the cable 15 because of the numerous gripping rings 31 which also seal against moisture entering the puller body 11 from the open end thereof.

It will be appreciated that the multiple lead cables 15 may be an inch or more in diameter and may be drawn for several hundred feet through underground ducts thus requiring great pulling forces, as in the order of 10,000 lbs., and such connector 11 must maintain a sufficiently positive connection with the cable 15 to withstand such forces. It has been learned that with the plurality of gripping rings 31 spaced along such connector, the leads 30 between such rings expand radially outwardly to cause the longitudinal cross section of the cable 15 within the connector body 11 to assume a configuration somewhat like a string of beads thereby providing positive gripping for each of the rings 31 and preventing the puller from slipping from the cable 15. When the duct terminal vault to which the cable 15 is being pulled is reached, the cable 15 may be cut immediately behind the puller body 11 and the relatively inexpensive connector discarded.

From the foregoing, it will be apparent that the method of the present invention provides an economical and convenient means for securing a cable puller connector to a multiple lead cable. It has been determined that a single workman can make such a connection in only a couple of minutes as contrasted with the prior art method which required two men at least 20 minutes. The connection is relatively secure and also provides a moisture seal preventing moisture from entering the open end of the cable.

Various modifications and changes may be made with regard to the foregoing detailed description without departing from the spirit of the invention.

I claim:

1. A method for forming a sealing and fastening joint between a tubular cable puller of the type that is closed on one end and open on the opposite end for telescopical receipt of the free end of a coated cable having multiple individually insulated leads forming a composite cross section having a predetermined dimension in one direction, said method comprising the following steps:

inserting said free end of said coated cable in the open end of said connector;

placing said connector and free end in a die of the type including transversely extending opposed blades having concave edges which form therebetween, when in their closed positions, an opening for surrounding said connector and positioning said cable end with said predetermined dimension parallel to the direction of travel of said blades;

forcing said blades toward one another with sufficient force to cause them to swage the wall of said connector inwardly against said coating from opposite sides thereof to form a gripping ring pressing said coated cable into a cross section reducing said one dimension of said composite predetermined cross section to no more than substantially 75% of its original dimension while holding the dimension transverse thereto at substantially its original dimension.

2. A method for forming a sealing and fastening joint as set forth in claim 1 wherein:

said connector and cable are circular-in-cross section and said blade edges form therebetween an elliptical opening and are forced toward one another with sufficient force to form said gripping ring with an elliptical cross section.

3. A method for forming a sealing and fastening joint as set forth in claim 1 wherein:

said blades are forced toward one another with a force of two tons.

4. A method for forming a sealing and fastening joint as set forth in claim 1 that includes the following step:

driving a plurality of wooden dowels longitudinally into the free end of said cable between certain ones of said multiple leads before insertion thereof into said connector.

5. A method for forming a sealing and fastening joint as set forth in claim 1 that includes the following step:

holding flat retaining plates at opposite ends of said blades parallel to the direction of travel thereof to retain the opposite sides of said cable during flattening thereof by said blades.

* * * * *